Jan. 6, 1970  W. K. PRIESE  3,488,033
SELF-PRESSURE RELIEVING BALL VALVE
Filed Dec. 28, 1967  2 Sheets-Sheet 1
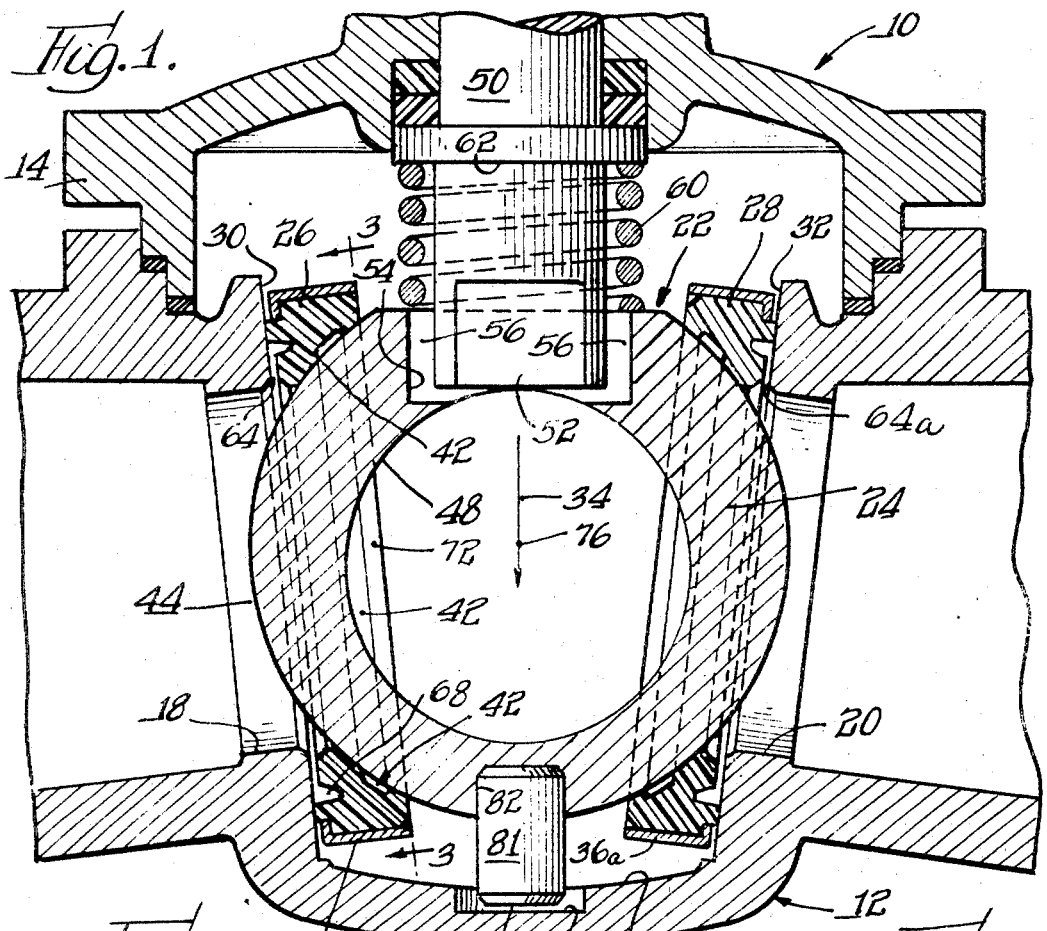
Fig.1.
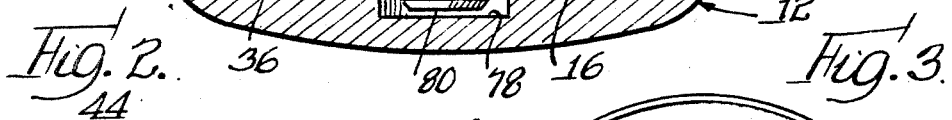
Fig.2.  Fig.3.
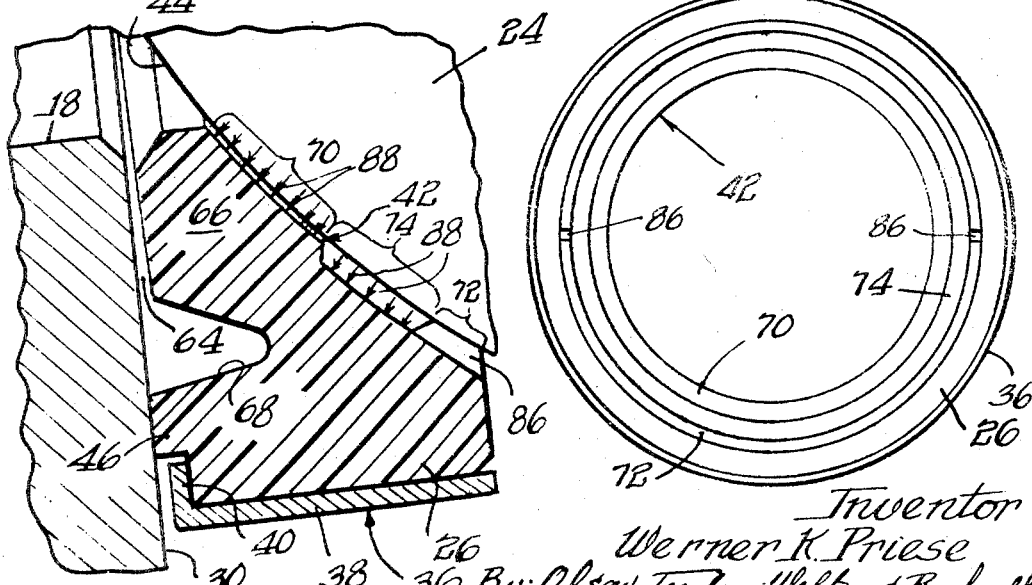
Inventor
Werner K. Priese
By: Olson, Trexler, Wolters & Bushnell
Attys Inventor
Werner K. Priese
By Olson, Trexler, Wolters & Bushnell attys United States Patent Office 3,488,033
Patented Jan. 6, 1970

1

3,488,033
SELF-PRESSURE RELIEVING BALL VALVE
Werner K. Priese, Barrington, Ill., assignor to Hills-McCanna Company, Carpentersville, Ill., a corporation of Delaware
Filed Dec. 28, 1967, Ser. No. 694,150
Int. Cl. F16k 25/02, 5/08, 51/00
U.S. Cl. 251—172   5 Claims

ABSTRACT OF THE DISCLOSURE

A ball valve having a flow control assembly, comprising a flow control ball sealably engaged on opposite sides by two annular seats individually adapted to relieve excessive internal valve pressure and being slidably supported respectively on seat support surfaces converging toward each other in one direction, which is movable in the direction of convergence of the seat support surfaces to effect operational tightening of the valve and which is positively limited in its movement in said direction of convergence by coacting abutment means so that the function of the seats in relieving excessive internal pressure is preserved under all operating conditions.

---

The present invention relates to ball valves having a movable flow control assembly comprising a rotary flow control ball sealably engaged on opposite sides by two annular seats encircling flow passages into the valve and being slidably supported respectively on two seat support surfaces converging toward each other in one lateral direction with respect to the flow passages into the valve. The valve is tightened to an optimum degree by displacing the flow control assembly including the ball and valve seats in the direction of convergence of the two support surfaces for the respective seats.

Valves of this type afford many inherent advantages. However, conventional valves of this general design have sometimes been subject to damage when exposed to environmental conditions that effect heating of fluid, particularly volatile liquids, that may be trapped in the valve. Thus, when such a valve is closed trapping fluid within the valve between the two seats coacting with the ball and subsequently heated as by the rays of the sun, the entrapped fluid tends to expand within the internal space within which it is confined by the two seats engaging opposite sides of the ball turned to its closed valve position.

The expanding fluid elevates the internal valve pressure above that prevailing in either of the connecting passages to the valve with the consequence that the abnormally elevated internal fluid pressure operates on the valve ball to force the movable flow control assembly including the ball and seats in the direction of convergence of the seat support surfaces. The effect of this is to further tighten engagement of the ball with both seats to preclude, in effect, the escape of fluid entrapped in the valve with the consequence that a continued increase in the temperature of the fluid entrapped in the valve may result in a corresponding increase in internal fluid pressure to a level sufficient to damage the valve through the application of damaging stress to the valve seats, the valve body or other valve parts vulnerable to damage by excessive fluid pressure.

One object of the invention is to provide an improved ball valve having a movable flow control assembly comprising a flow control ball sealably engaged on opposite sides by two annular seats slidably supported respectively on seat support surfaces converging toward each other in one direction in such manner that the valve is tightened to an optimum degree by displacement of the flow control assembly in the direction of convergence of the seat support surfaces, the improved valve functioning, in the

2 event of heating of fluid entrapped in the closed valve producing an abnormal rise in fluid pressure within the valve, to release effectively the excessive pressure build up within the valve to the end that the valve is effectively protected from damage and operational difficulties.

A further object is to provide an improved ball valve as recited in the preceding object in which the flow control ball is sealably engaged on opposite sides by two annular valve seats slidably supported on seat support surfaces having a converging relation to each other and in which the movement of the valve ball and valve seats in the direction of convergence of the seat support surfaces to effect tightening of the valve is positively limited in extent by coacting abutment means so that the function of the seats in relieving excessive internal valve pressure due to heating a fluid trapped in the closed valve is preserved under all operating conditions.

A further object is to provide a valve of the character recited which is rendered capable of releasing excessive internal pressure by the discharge of internal fluid into the upstream connecting passage under operating conditions effecting heating of fluid entrapped in the valve, the improved valve, by virtue of its construction, being inherently adapted for manufacture at a cost only moderately higher than that of producing conventional valves subject to operational problems such as those previously alluded to.

Other objects and advantages will become apparent from the following description of the exemplary embodiment of the invention illustrated in the drawings, in which:

FIG. 1 is a longitudinal sectional view of a ball valve embodying the invention;

FIG. 2 is a fragmentary radial sectional view, on an enlarged scale, of the upstream valve seat illustrating graphically the forces of fluid pressure operating on the seat to release fluid entrapped in the valve and showing the relationship of the seat to adjacent ball and seat support structure;

FIG. 3 is a fragmentary sectional view taken with reference to the line 3—3 of FIG. 1 and showing a side view of the upstream seat, the structure of the ball being left out of FIG. 3 to more clearly reveal the annular sealing surface on the seat;

Figure 4:
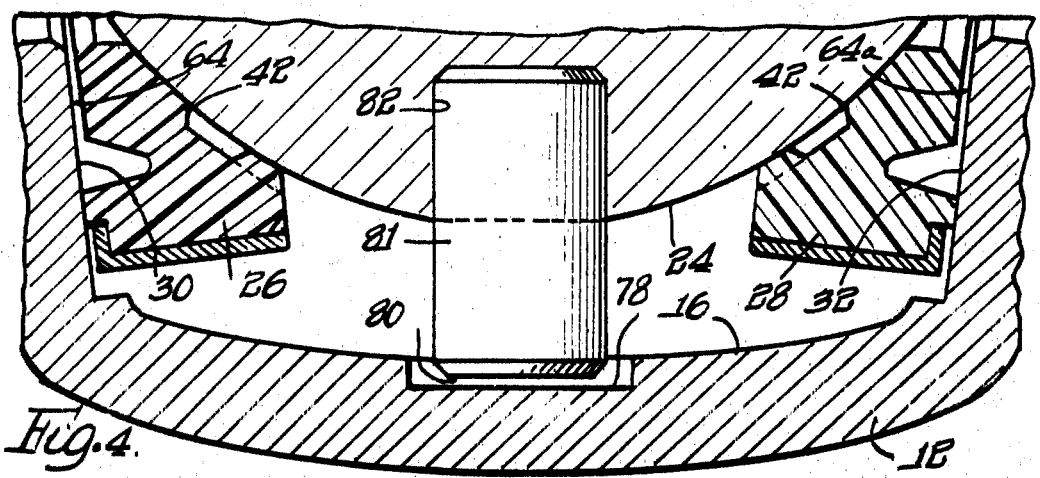
FIG. 4 is a fragmentary sectional view corresponding to the lower portion of FIG. 1 and illustrating on an enlarged scale the relationship of the two valve seats to the ball and support structure for the seats before the valve is subjected to a substantial differential fluid pressure tending to force the flow of fluid through the valve.
Figure 5:
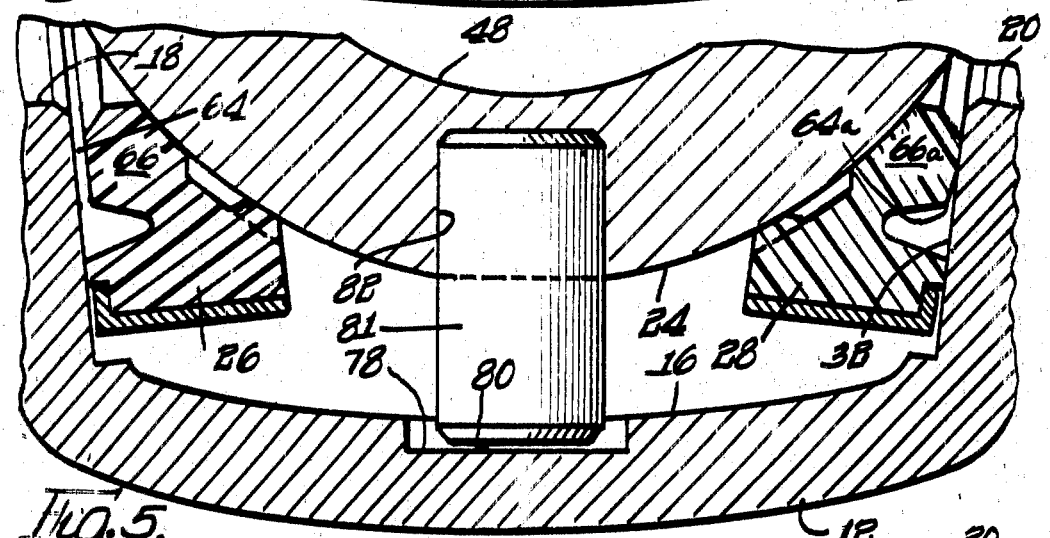
Figure 6:
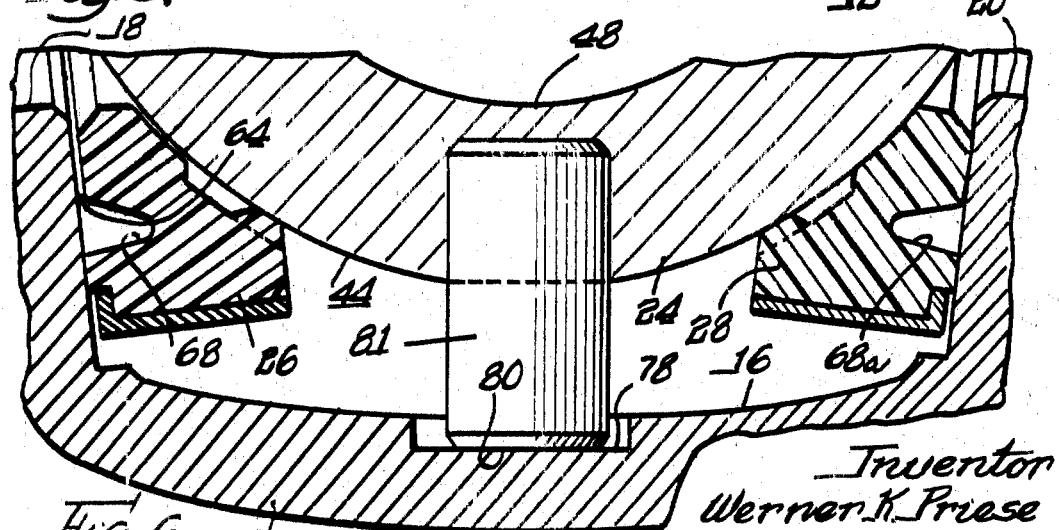

FIG. 5 is a view similar to FIG. 4 but illustrating the relationship of the valve seats to the ball and to the support structure for the respective seats in a normal, closed valve operating condition when the ball is subjected to differential fluid pressure displacing the ball to the right, with reference to FIG. 4, against the downstream valve seat; and FIG. 6 is a view similar to FIG. 5 but illustrating the operating condition which prevails when fluid trapped in the valve is subjected to heating, producing an elevation in internal fluid pressure that is relieved by operation of the upstream valve seat as illustrated graphically on an enlarged scale in FIG. 2 and as assured by the coacting of abutment structure as illustrated in FIG. 6.

Referring to the drawings in greater detail, the ball valve 10 forming the illustrated embodiment of the invention comprises a valve body 12 including a detachable valve bonnet 14 and defining an internal valve chamber 16 and two flow passages 18, 20 opening into the chamber 16.

The flow of fluid through the valve is controlled by a movable valve assembly, denoted generally by the number 22, comprising a rotary flow control ball 24 and two annular valve seats 26, 28 of similar construction sealably engaging opposite sides of the ball and being disposed in encircling relation to the respective passages 18, 20 in slidable engagement respectively with two generally flat seat support surfaces 30, 32 formed on the valve body 12 in encircling relation to the inner ends of the passages 18, 20 and having a converging relation to each other in a predetermined direction indicated in FIG. 1 by the arrow 34 and extending laterally in relation to the passages 18, 20.

The two annular valve seats 26, 28 are each formed of a yieldable material, preferably a yieldable polymeric material, which, for purposes of understanding the present invention, may be any one of a number of such materials commonly used by those skilled in the art in the construction of yieldable seats in ball valves. One such material commonly used in the construction of yieldable valve seats and to which reference is made for the purpose of illustration is polytetrafluoroethylene, sold commercially under the trademark "Teflon."

Another material commonly used in the construction of yieldable valve seats and being well adapted for use in the valve seats 26, 28 is polytetrafluoroethylene internally reinforced by an internal dispersion of a suitable filler material, usually an infusible, inorganic material, such reinforced polytetrafluoroethylene often being referred to as "reinforced" polytetrafluoroethylene.

As the two valve seats 26, 28 individually are identical in construction, a detailed description of one will suffice for both, component elements and features of the seat 28 corresponding to similar components and elements of the seat 26 being identified with the same reference numbers with the addition of the suffix a.

The yieldable seat 26 is encircled by a metal seat ring 36 which is, in this instance, generally L-shaped in radial section. A long cylindrical leg 38, FIG. 2, of the seat ring 36 closely embraces the outer periphery of the seat 26 to restrain the yieldable structure of the seat against radial expansion under compressive load in operation. A relatively short, flat leg 40 of the seat ring 36 extends radially inward in overlapping relation to the axially outward marginal edge of the seat 26 and in spaced relation to the flat seat support surface 30, as shown in FIG. 2, to assure retention of the seat ring 36 in its normal encircling relation to the yieldable structure of the seat 26.

The seat 26 defines an annular sealing surface of rather extensive lateral width, indicated generally by the reference number 42, confronting the generally spherical external surface 44 of the ball 24 to form a slidable seal between the ball and seat in the manner to be described.

As shown best in FIG. 2, the seat 26 has in radial section an overall shape which can be visualized to advantage as approximating that of a triangle truncated somewhat at the corners adjacent the ball, the sealing surface 42 extending along the major portion of the corresponding lateral width of the seat.

While the sealing surface 42 slidably engages the ball surface 44 to form a seal between the seat and ball as indicated, an annular portion 46, FIG. 2, of the seat 26 located adjacent the encircling seat ring 36 slidably engages the coacting support surface 30 to form a seal between the seat and the support surface 30 on the valve body 12.

The ball 24 is rotated between open valve and closed valve positions to turn a ball bore 48 into and out of alignment with the passages 18, 20 by means of a rotary valve control stem 50 extending through the valve body 12 and having a flatted internal driving tang 52 extending into a coacting slot 54 formed in the ball 24 and providing clearance 56 along opposite side edges of the tang which allows the ball 24 to move under the force of differential fluid pressure on the ball in the direction of either of the fluid passages 18, 20 to engage the downstream one of the valve seats 26, 28 with the force of differential fluid pressure on the ball when the valve is closed.

Residual tightening of the valve to an optimum degree of tightness is effected by displacing the flow control assembly including the ball 24 and the two seats 26, 28 in the direction 34, FIG. 1, of convergence of the seat support surfaces 30, 32 with the consequence that the valve is progressively tightened as the movable flow control assembly is moved progressively into the narrowing distance between the seat support surfaces 30, 32 which have a converging relation to each other as described.

In the valve illustrated, displacement of the flow control assembly in the direction 34 to the degree required to obtain optimum residual tightening of the valve is effected by means of a helical compression spring 60 encircling the inner end of the control stem 50 between a shoulder 62 on the control stem and the ball 24, which is movable in the direction 34 in relation to the control stem.

The normal positions of the seats 26, 28 in relation to the ball 24 and seat support surfaces 30, 32, when the ball is turned to its open valve position or turned to its closed valve position but not subjected to differential pressure tending to force fluid through the valve, are illustrated in FIG. 4. As the valve is tightened to an optimum degree in the manner described, both of the seats 26, 28 form seals with the ball 24.

The response of the ball 24, when turned to its closed valve position and subjected to differential pressure tending to force fluid through the valve, is illustrated in FIG. 5, it being assumed in FIG. 5 that the fluid passage 18 is subjected to the higher fluid pressure and becomes the upstream side of the valve and that the passage 20 is subjected to the lower pressure and becomes the downstream side of the valve. The ball 24 being free to move under the force of fluid pressure on the ball is displaced somewhat, as illustrated in FIG. 5, toward the downstream valve seat 28 which serves to sustain and support the ball against the force of differential fluid pressure on the ball. The force of fluid pressure on the ball as applied to the downstream seat 28 and transmitted by the seat 28 to the supporting surface 32 for the seat 28 intensifies the sealing pressures existing between the downstream seat 28 and ball 24 and between the downstream seat 28 and its supporting surface 32 to assure the effectiveness of the sealing action provided by the seat 28 between the ball 24 and valve body 12 on the downstream side of the ball.

Hence, the valve chamber 16 is isolated from the downstream passage 20. At the same time, the valve chamber 16 is isolated from free communication with the upstream passage 18 by the upstream seat 26 sealably interposed between its support surface 30 and the ball 24.

Under most operating conditions, isolation of the valve chamber 16, when the valve is closed from both the upstream and downstream passages 18, 20, presents no problem, even in conventional valves of the general design described thus far.

Under the most commonly encountered operation conditions contemplated, the fluid trapped in the valve chamber 16, when the valve is closed, continues to have a pressure which is no higher than the fluid pressure applied to the upstream side of the valve. When the pressure of the fluid entrapped within the valve remains at a level no higher than the upstream fluid pressure, no difficulty is experienced normally because of the valve structure being exposed to no fluid pressure greater than the fluid pressures in the service for which the valve is designed.

However, in the event of subsequent heating of the fluid entrapped within the valve chamber 16, such as may occur as a consequence of the valve receiving radiant heat from the rays of the sun or heat from some other source within the environment subsequent to closure of the valve, the increased temperature of the entrapped fluid tends to produce a rise in fluid pressure within the valve chamber 16 which has a substantially constant volumetric capacity. The tendency for the fluid pressure to rise with increasing fluid temperature is particularly pronounced when volatile fluids are isolated in the valve.

By reason of the previously described converging relationship of the two seat support surfaces 30, 32 encircling the respective fluid passages 18, 20, an increase in the fluid pressure in the chamber 16 above the fluid pressure prevailing in the fluid passages 18, 20 tends to displace the valve assembly comprising the ball 24 and seats 26, 28 in the direction 34 of convergence of the seat support surfaces 30, 32 to effect an increased tightening of both seats 26, 28 against the upstream and downstream sides respectively of the ball 24. Such a displacement of the movable flow control assembly in the direction 34 increases the sealing action of the upstream seat as well as that of the downstream seat with the consequence that the entrapment of fluid in the closed chamber 16 is intensified.

Further increases in internal fluid pressure as a consequence of a possible continued elevation in temperature tend to increase the degree of displacement of the valve assembly in the direction 34 with a concomitant increase in the tightness of the seals formed by the seats 26, 28 on both sides of the valve ball. If no fluid is permitted to escape from the closed chamber 16, continued increases in the temperature of the entrapped fluid may result in internal fluid pressures soaring high above the upstream fluid pressure for which the valve was originally designed and which can, if not released, cause permanent damage to the valve structure by damaging deformation of the valve seats and possibly a rupture of the valve body.

However, the valve 10 incorporating the invention responds to an incipient build up in fluid pressure in the chamber 16 above the pressure in the upstream passage 18 or 20 to release fluid past the upstream valve seat into the upstream passage. Release of entrapped fluid into the upstream passage in the manner to be described protects the valve from damage while at the same time avoiding any discharge of fluid to the downstream side of the valve. Thus, the fluid is released to the upstream passage which is already filled with the same fluid and fluid is prevented from entering the downstream passage from which it may be quite important to cut off the entry of fluid.

Having reference to the drawings, particularly FIGS. 1 and 2, the valve seat 26, for example, is shaped and positioned in relation to the coacting support surface 30 to provide between the support surface 30 and the valve seat 26 an annular clearance space 64 extending radially inward alongside the seat 26 from the annular portion 46, FIG. 2, of the seat 26 extending axially into slidable sealing engagement with the support surface 30. The clearance 64 allows limited displacement of the inner portion 66 of the seat 26 in an axially outward direction in response to force applied to the seat by the ball or by fluid pressure in the manner to be described.

Preferably flexing of the inner portion 66 of the seat 26 is an axially outward direction is facilitated by an annular notch 68 formed in the medial portion of the seat as illustrated in FIGS. 1 and 2 and extending axially inward into the seat structure from the axially outward radial side of the seat at a location medially disposed between the inner and outer radial peripheries of the seat as illustrated.

The seats 26, 28, while yieldable, nevertheless are stiff and have substantial resistance to bending. The manner in which the ball 24 is displaced toward the downstream passage 20, for example, against the yieldable resistance of the downstream seat 28 under the load of differential fluid pressure on the ball is illustrated in FIG. 5.

The effect of such displacement of the ball 24 in the downstream direction is to reduce the radial clearance 64a alongside the downstream seat 28 to the extent that the clearance 64a may become nonexistent, as illustrated in FIG. 5, the degree of reduction being related to the force of fluid pressure on the ball. The maximum degree of downstream deflection of the inward portion 66a of the downstream seat 28 is positively limited by engagement of the seat portion 66a directly with the support surface 32.

At the same time, the inner portion 66 of the upstream seat 26 tends to remain in engagement with the ball 24 by virtue of its residual shape and with the aid of upstream fluid pressure entering the radial clearance 64, FIG. 4, on the upstream side of the seat 26.

As will presently appear, provision is made for assuring preservation of at least a reduced portion of the clearance 64 extending radially alongside the upstream seat, even in the event of an incipient build up of internal fluid pressure above the upstream fluid pressure and tending to displace the flow control assembly 22 in its valve tightening direction 34, FIG. 1.

As illustrated in FIGS. 2 and 3, the annular sealing surface 42 of the valve seat 26, for example, is shaped in radial section to have an annular sealing zone 70 of substantial lateral width extending laterally from the edge of the sealing surface 42 adjacent the corresponding passage 18. Also, the sealing surface 42 has an annular ball support zone 72 of lesser lateral width extending laterally from the edge of the sealing surface 42 more remote from the passage 18.

Between the sealing zone 70 and the ball support zone 72, the sealing surface 42 is recessed within an annular seal-lifting zone 74 preferably overlapping radially somewhat the radial location of the notch 68 formed in the axially outward side of the seat as illustrated.

The annular portion of the sealing surface 42 disposed within the seal-lifting zone 74, when the seal 26 is in its unstressed condition, is located, with reference to the center 76, FIG. 1, of the ball 24, radially outward of the annular portion of the sealing surface disposed within the sealing zone 70 and radially outward of the annular portion of the sealing surface disposed within the ball support zone 72.

As previously stated, provision is made for assuring maintenance of at least a reduced portion of the clearance 64 extending radially alongside the inner portion 66 of the upstream seat 26, which, as indicated in FIG. 2, defines and directly supports the annular sealing surface portion within the sealing zone 70 of the sealing surface 42. This assurance of continued existence of clearance 64 on the upstream side of the upstream seat is assured by the coaction of first abutment means 78 on the valve body 12 with second abutment means 80 provided on the movable flow control assembly 22 especially for this purpose.

In the preferred construction illustrated, the second abutment means 80 has the structural form of a short pin 81 fixedly mounted in the lower portion of the ball 24, with reference to FIG. 1, in parallel relation to the direction 34 of convergence of the seat support surfaces 30, 32 and extending into opposed confronting relation to the abutment 78 formed preferably, as shown, by machining an internal flat, also denoted by the number 78, on the valve body 12 in the bottom of the valve chamber 16.

The pin 81 may have a pressed fit in a supporting bore 82 in the ball 24. It is dimensioned and positioned in relation to the ball 24 and in relation to the abutment flat 78 so that the abutment 80 on the projecting end of the pin 81 and the valve body abutment 78 mutually engage each other, as shown in FIG. 6, as an incident to displacement of the ball 24 in the direction 34, to terminate movement of the flow control assembly 22 in the direction 34 somewhat before the radial clearance 64, FIGS. 2, 4 and 6, along the upstream seat would otherwise be taken up by continued displacement of the assembly 22 in the valve tightening direction 34.

While reference has been made to preservation of the clearance 64 alongside the seat 26, it will be appreciated that the construction of the valve is generally symmetrical with respect to the direction of flow through the valve and that the same considerations would prevail with respect to maintenance of the clearance 64a alongside the seat 28 if the normal direction of flow of fluid through the valve was in the opposite direction.

Having reference to FIG. 6 in which it is assumed that the normal direction of flow is from left to right and that the seat 26 is on the upstream side of the ball, this figure illustrates engagement of the movable abutment 80 with the stationary abutment 78 to terminate valve tightening movement of the assembly 22 in the direction 34 while a degree of clearance 64 remains alongside the upstream seat 26 as indicated. The condition then prevailing at the upstream seat is indicated on a larger scale in FIG. 2.

Assuming that there is an incipient build up of fluid pressure in the chamber 16 due to heating of fluid isolated in the closed valve, the internal fluid, even under the elevated pressure, is unable to escape past the downstream seat 28 because of the high sealing pressures on the downstream seat created by the force of fluid pressure urging the ball against the downstream seat as mentioned. However, the sealing pressure prevailing between the upstream seat 26 and the ball 24 is less with the consequence that the differential pressure created by the increase in temperature of the entrapped fluid and acting on the interface between the ball surface 44 and the recessed sealing surface in the seal-lifting zone 74 functions to force the radially inward portion of the upstream seat in the direction of the clearance 64 which is preserved for this purpose, thus effecting a separation of the sealing surface 42 in the sealing zone 70 from the ball surface 44 creating in this manner an escape path through which sufficient fluid is bled from the valve chamber 16 back into the upstream passage 18 to dissipate the elevated pressure within the valve chamber before damaging pressure levels are reached.

It is preferred, particularly in the construction of valves in the larger sizes in which valves of this general type are produced, to provide one or more communication grooves 86 in the seat surface defining face of each seat to extend laterally across the portion of the sealing surface 42 within the ball support zone 72 to assure admission of fluid under the highest pressure developed within the chamber 16 to the interface between the ball surface 44 and the portion of the sealing surface within the seal-lifting zone 74. When valves of smaller size are closed, communication can prevail between the interior of the chamber 16 and the portion of the sealing surface 42 within the seal-lifting zone 74 independently of communication grooves formed in the sealing surface within the ball support zone 72 with the consequence that in such valves of smaller size the communication grooves 86 can be eliminated if desired. The condition that can prevail in such valves of smaller size, when closed, is illustrated in FIG. 1. The width and position of the surface 42 of the seat 26, for example, in relation to the position of the ball bore 48, when the valve is closed, is such that the ball support zone 72 and a portion of the seal-lifting zone 74 overlap opposite ends of the ball bore 48 with the consequence that fluid within the chamber 16 crosses opposite ends of the bore 48 to have direct access to the portion of the seat surface 42 within the seal-lifting zone 74.

The manner in which the pressure of fluid admitted to the interface between the seat 26 and the ball 24 within the zone 74 acts on the surface 42 within the zone 74 to lift the upstream seat away from the ball 24 to allow the escape of fluid pressure from the chamber 16 is illustrated graphically by arrows 88 in FIG. 2.

The invention is claimed as follows:

1. A ball valve comprising, in combination, a valve body defining an internal valve chamber and two flow passages opening into said chamber, a flow control ball rotatably disposed within said chamber and being movable in the direction of either of said passages under the force of fluid pressure on the ball, said valve body having two generally flat seat support surfaces encircling the inner ends of said respective passages and having a nonparallel relationship in which the surfaces are disposed in converging relation to each other in a predetermined lateral direction with reference to said passages, two annular valve seats formed of a yieldable polymeric material and being slidably supported on said respective support surfaces in encircling relation to said respective passages and slidably engaging said ball, each seat having an annular sealing surface of substantial width confronting said ball for coaction therewith, said sealing surface of each seat having an annular sealing zone located near the lateral edge of the sealing surface adjacent the passage encircled by the seat, each seat sealing surface having an annular seal-lifting zone located laterally at the edge of said sealing zone more remote from the adjacent passage, the annular portion of said sealing surface disposed within said seal-lifting zone when the seat is in its unstressed condition being located with reference to the center of said ball radially outward of the annular portion of the sealing surface disposed within said sealing zone, each seat being shaped and positioned in relation to the coacting support surface to provide between the support surface and the seat when the seat is free of externally applied stress clearance extending radially alongside the portion of the seat defining the portion of the sealing surface within the sealing zone, valve tightening means coacting with said ball and said seats to urge the ball and seats in said direction of convergence of said seat support surfaces to effect tightening of the valve, said ball and seats being movable in said direction of convergence of said seat support surfaces by the force of fluid pressure in said valve chamber in excess of the fluid pressures in said passages with the consequence of diminishing said clearance provided radially alongside each seat between the seat and its coacting seat support surface, a first abutment on said valve body disposed in aligned opposition to said direction of convergence of said seat support surfaces, an abutment pin mounted in said ball and defining a second abutment confronting said first abutment for coaction therewith to limit the displacement of said ball in said direction of convergence under the force of fluid pressure in said valve chamber to preclude elimination of said clearance extending radially alongside the upstream one of said valve seats, and control means coacting with said ball to rotate the latter.

2. A ball valve comprising, in combination, a valve body defining an internal valve chamber and two flow passages opening into said chamber, a movable valve assembly comprising a flow control ball rotatably disposed within said chamber and being movable in the direction of either of said passages under the force of fluid pressure on the ball, said valve body having thereon two generally flat seat support surfaces encircling the inner ends of said respective passages and converging toward each other in a predetermined lateral direction with reference to said passages, said valve assembly including two annular valve seats formed of a yieldable polymeric material and being slidably supported on said respective support surfaces in encircling relation to said respective passages and slidably engaging said ball, each seat having an annular sealing surface of substantial width confronting said ball for coaction therewith, said sealing surface of the upstream one of said seats having an annular sealing zone located near the lateral edge of the sealing surface nearest the adjacent passage, said sealing surface of the upstream seat having an annular seal-lifting zone located laterally at the edge of said sealing zone more remote from the adjacent passage, the annular portion of said sealing surface disposed within said seal-lifting zone when the upstream seat is in its unstressed condition being located with reference to the center of said ball radially outward of the annular portion of the sealing surface disposed within said sealing zone; the upstream seat being shaped and positioned in relation to the coacting support surface to provide between the support surface and the seat, when the seat is free of externally applied stress, clearance extending radially alongside a material portion of the seat aligned radially with the sealing zone of the sealing surface; means coacting with said valve assembly to force the latter in said direction of convergence of said seat support surfaces to effect tightening of the valve, said valve assembly being movable in said direction of convergence of said seat support surfaces by the force of fluid pressure in said valve chamber in excess of the fluid pressures in said passages with the consequence of diminishing said clearance provided radially alongside the upstream seat between the seat and its coacting seat support surface, first abutment means on said body, second abutment means on said valve assembly confronting said first abutment means for coaction therewith to limit the displacement of said valve assembly in said direction of convergence under the force of fluid pressure in said valve chamber to preclude elimination of said clearance extending radially alongside said upstream valve seat, and control means coacting with said ball to rotate the latter.

3. A ball valve comprising, in combination, a valve body defining an internal valve chamber and two flow passages opening into said chamber, a movable valve assembly comprising a flow control ball rotatably disposed within said chamber and being movable in the direction of either of said passages under the force of fluid pressure on the ball, said valve body having thereon two generally flat seat support surfaces encircling the inner ends of said respective passages and converging toward each other in a predetermined lateral direction with reference to said passages, said valve assembly including two annular valve seats formed of a yieldable polymeric material and being slidably supported on said respective support surfaces in encircling relation to said respective passages and slidably engaging said ball, each seat having an annular sealing surface slidably engaging said ball to seal the valve against the passage of fluid therethrough when the valve is closed, the upstream one of said seats being shaped and positioned in relation to the coacting support surface to provide between the support surface and the seat when the seat is free of externally applied stress clearance extending from the inner periphery of the seat radially outward alongside a large portion of the seat, means coacting with said valve assembly to force the latter in said direction of convergence of said seat support surfaces to effect tightening of the valve, said valve assembly being movable in said direction of convergence of said seat support surfaces by the force of fluid pressure in said valve chamber in excess of the fluid pressures in said passages with the consequence of diminishing said clearance provided radially alongside the upstream seat between the seat and its coacting seat support surface, first abutment means on said body, second abutment means on said valve assembly coacting with said first abutment means to limit the displacement of said valve assembly in said direction of convergence under the force of fluid pressure in said valve chamber to preclude elimination of said clearance extending radially alongside said upstream valve seat, and control means coacting with said ball to rotate the latter.

4. A ball valve comprising, in combination, a valve body defining an internal valve chamber and two flow passages opening into said chamber, a movable valve assembly comprising a flow control ball rotatably disposed within said chamber and being movable in the direction of either of said passages under the force of fluid pressure on the ball, said valve body having thereon two generally flat seat support surfaces encircling the inner ends of said respective passages and converging toward each other in a predetermined lateral direction with reference to said passages, said valve assembly including two annular valve seats formed of a yieldable polymeric material and being slidably supported on said respective support surfaces in encircling relation to said respective passages and slidably engaging said ball, each seat having an annular sealing surface of substantial width confronting said ball for coaction therewith, said sealing surface of the upstream one of said seats having an annular sealing zone located near the lateral edge of the sealing surface nearest the adjacent passage, said sealing surface of the upstream seat having an annular seal-lifting zone located laterally at the edge of said sealing zone more remote from the adjacent passage, the sealing surface of the upstream seat having an annular ball supporting zone extending laterally from said seal-lifting zone to the edge of the sealing surface most remote from the adjacent passage, the annular portion of said sealing surface disposed within said seal-lifting zone when the upstream seat is in its unstressed condition being located with reference to the center of said ball radially outward of the annular portion of the sealing surface disposed within said sealing zone and radially outward of the annular portion of the sealing surface in said ball supporting zone, the upstream seat being shaped and positioned in relation to the coacting support surface to provide between the support surface and the seat when the seat is free of externally applied stress clearance extending from the inner periphery of the seat radially outward alongside that portion of the seat defining the annular portion of the sealing surface within said sealing zone, means coacting with said valve assembly to force the latter in said direction of convergence of said seat support surfaces to effect tightening of the valve, said valve assembly being movable in said direction of convergence of said seat support surfaces by the force of fluid pressure in said valve chamber in excess of the fluid pressures in said passages with the consequence of diminishing said clearance provided radially alongside the upstream seat between the seat and its coacting seat support surface, first abutment means on said body, second abutment means on said valve assembly confronting said first abutment means for coaction therewith to limit the displacement of said valve assembly in said direction of convergence under the force of fluid pressure in said valve chamber to preclude elimination of said clearance extending radially alongside said upstream valve seat, said upstream seat defining a communication groove extending laterally across said ball support zone of said sealing surface to apply fluid pressure from within said valve chamber to said sealing surface within said seal-lifting zone, and control means coacting with said ball to rotate the latter.

5. A ball valve comprising, in combination, a valve body defining an internal valve chamber and two flow passages opening into said chamber, a flow control ball rotatably disposed within said chamber and being movable in the direction of either of said passages under the force of fluid pressure on the ball, said valve body having two generally flat seat support surfaces encircling the inner ends of said respective passage and having a nonparallel relationship in which the surfaces are disposed in converging relation to each other in a predetermined lateral direction with reference to said passages, two annular valve seats formed of a yieldable polymeric material and being slidably supported on said respective support surfaces in encircling relation to said respective passages and slidably engaging said ball, each seat having an annular sealing surface of substantial width confronting said ball for coaction therewith, said sealing surface of each seat having an annular sealing zone located near the lateral edge of the sealing surface adjacent the passage encircled by the seat, each seat sealing surface having an annular seal-lifting zone located laterally at the edge of said sealing zone more remote from the adjacent passage, each seat sealing surface having an annular ball supporting zone extending laterally from said seal-lifting zone to the edge of the sealing surface most remote from the adjacent passage, the annular portion of said sealing surface disposed within said seal-lifting zone when the seat is in its unstressed condition being located with reference to the center of said ball radially outward of the annular portion of the sealing surface disposed within said sealing zone and radially outward of the annular portion of the sealing surface in said ball supporting zone, each seat being shaped and positioned in relation to the coacting support surface to provide between the support surface and the seat when the seat is free of externally applied stress clearance extending from the inner periphery of the seat radially outward alongside the portion of the seat defining the portion of the sealing surface within the sealing zone, each seat defining therein an annular groove medially located between the inner and outer peripheries of the seat and extending into the seat from the side thereof adjacent the coacting seat support surface, means coacting with said ball and said seats to force the ball and seats in said direction of convergence of said seat support surfaces to effect tightening of the valve, said ball and seats being movable in said direction of convergence of said seat support surfaces by the force of fluid pressure in said valve chamber in excess of the fluid pressures in said passages with the consequence of diminishing said clearance provided radially alongside each seat between the seat and its coacting seat support surface, a first abutment on said valve body disposed in aligned opposition to said direction of convergence of said seat support surfaces, an abutment pin mounted in said ball and defining a second abutment confronting said first abutment for coaction therewith to limit the displacement of said ball in said direction of convergence under the force of fluid pressure in said valve chamber to preclude elimination of said clearance extending radially alongside the upstream one of said valve seats, and control means coacting with said ball to rotate the latter.

References Cited

UNITED STATES PATENTS

| | | | |
|---|---|---|---|
| 2,989,990 | 6/1961 | Bass | 251—315 X |
| 3,100,499 | 8/1963 | Bass | 251—315 X |
| 3,146,988 | 9/1964 | Riopelle | 251—315 |
| 3,168,279 | 2/1965 | Anderson | 251—315 X |
| 3,425,663 | 2/1969 | Priese | 251—315 X |
| 3,030,068 | 4/1962 | Priese | 251—172 X |

CLARENCE R. GORDON, Primary Examiner

U.S. Cl. X.R.

251—175, 184, 284, 315